United States Patent
Tanaka

(10) Patent No.: US 6,199,033 B1
(45) Date of Patent: Mar. 6, 2001

(54) LAN EMULATION SERVER CHANGING OVER METHOD

(75) Inventor: Yumi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/130,517

(22) Filed: Aug. 7, 1998

(30) Foreign Application Priority Data

Aug. 15, 1997 (JP) .................................................. 9-235453

(51) Int. Cl.[7] .................................................. G06F 15/16
(52) U.S. Cl. .......................... 703/23; 709/226; 709/239; 714/4
(58) Field of Search ........................... 703/23, 25; 714/4; 709/239, 226

(56) References Cited

U.S. PATENT DOCUMENTS

| | | | |
|---|---|---|---|
| 5,157,663 | * 10/1992 | Major et al. | 714/10 |
| 5,592,611 | * 1/1997 | Midgely et al. | 714/4 |
| 5,696,895 | * 12/1997 | Hemphill et al. | 714/4 |
| 5,754,752 | * 5/1998 | Sheh et al. | 714/4 |
| 5,796,934 | * 8/1998 | Bhanot et al. | 714/4 |
| 5,822,512 | * 10/1998 | Goodrum | 714/13 |
| 5,828,847 | * 10/1998 | Gehr et al. | 709/239 |
| 6,128,657 | * 10/2000 | Okanoya et al. | 709/224 |

FOREIGN PATENT DOCUMENTS

| | | |
|---|---|---|
| 07182297 | 7/1995 | (JP) . |
| 9-259096 | 10/1997 | (JP) . |
| 9-311843 | 12/1997 | (JP) . |
| 10-11369 | 1/1998 | (JP) . |
| 10-75256 | 3/1998 | (JP) . |
| 10-224378 | 8/1998 | (JP) . |
| 10-226221 | 8/1998 | (JP) . |
| 10-257065 | 9/1998 | (JP) . |
| 10-276228 | 10/1998 | (JP) . |
| 10-320323 | 12/1998 | (JP) . |

OTHER PUBLICATIONS

Budhiraja, N. et al., "Tradeoffs in Implementing Primary–Backup Protocols", 7th IEEE Symp. on Parallel and Distributed Processing, Oct. 1995, pp. 280–288.*

Japanese Office Action, dated May 30, 2000, with English language translation of Japanese Examiner's comments.

The ATM Forum Technical Committee, "LAN Emulation Over ATM Version2 –LUNI Specification", AF–LANE–0084.000, Jul. 1997.

* cited by examiner

Primary Examiner—Kevin J. Teska
Assistant Examiner—Kyle J. Choi
(74) Attorney, Agent, or Firm—McGuireWoods LLP

(57) ABSTRACT

A spare one of a plurality of LAN emulation servers subscribes as a LAN emulation client for an operational one of the LAN emulation servers and supervises a condition of the operational server. If an abnormal condition of the operational server is detected, then the spare server issues an operational/spare changing over request to the operational server and is changed over to an operational server whereas the former operational server is changed over to a spare server. When the operational server is changed over to a spare LAN emulation server, it releases LAN emulation clients which have been subscribed for the operational LAN emulation server till then, and the released LAN emulation clients subscribe for the new operational LAN emulation server.

10 Claims, 4 Drawing Sheets

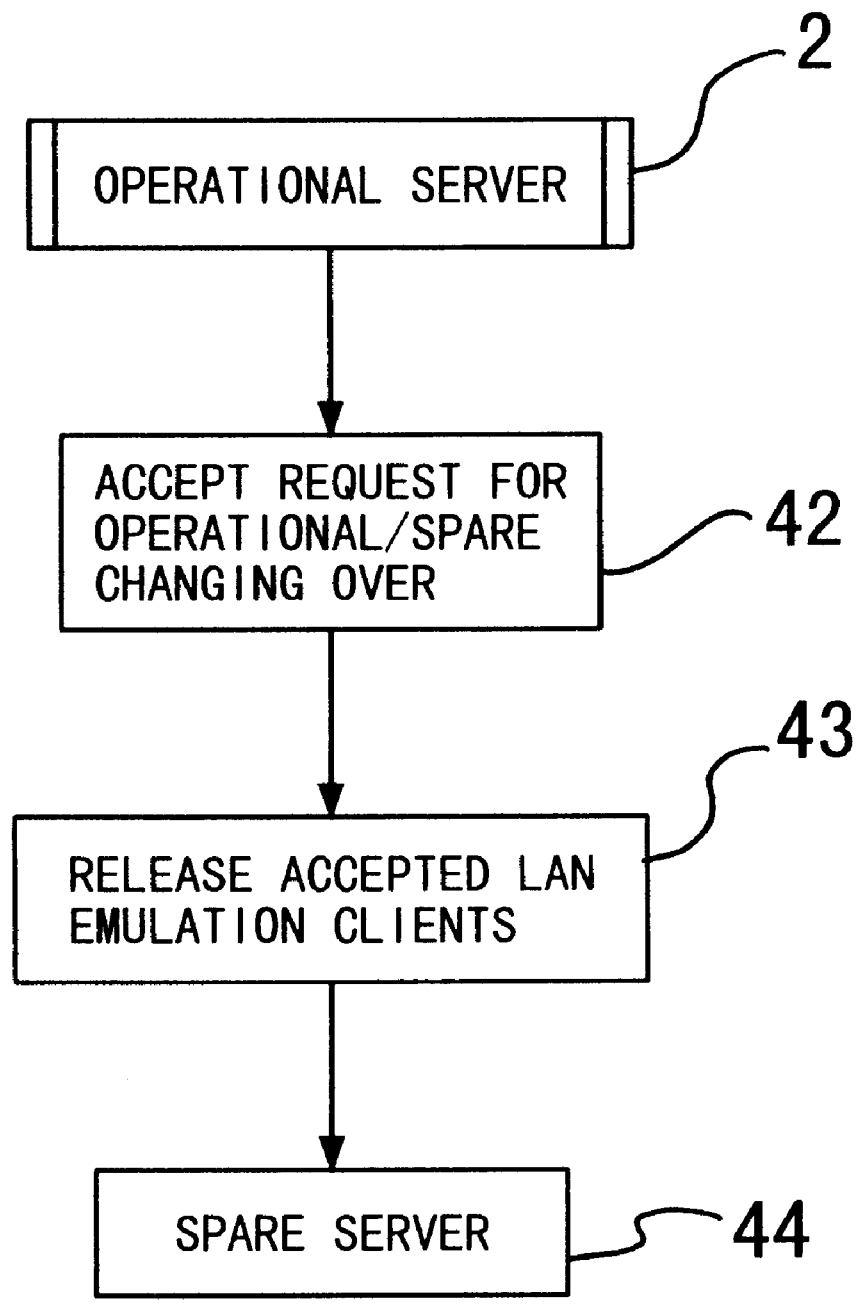

LAN EMULATION SERVER CHANGING OVER METHOD

BACKGROUND OF THE INVENTION

1. Field of the Invention

This invention relates to a network realized by LAN (Local Area Network) emulation, and more particularly to a LAN emulation server changing over method which allows continuous operation of a network in which LAN emulation servers are redundantly arranged and one of the LAN emulation servers acts as an operational LAN emulation server while the other one or ones of the LAN emulation servers act as a spare LAN emulation server or servers, when a failure occurs with the operational LAN emulation server, without manual changing over of the servers by a maintenance engineer.

2. Description of the Related Art

In a LAN emulation system, a failure of a LAN emulation server which performs address solution and broadcasting between communication terminals is a critical failure by which the entire system is disabled and the network is halted. Where a plurality of LAN emulation servers are disposed on a same network in order to prevent such system down, there is the possibility that the LAN emulation servers may be put into an operative condition simultaneously, resulting in disintegration of the network.

Meanwhile, where a dual construction is realized by a health check by a fixed bus between a plurality of LAN emulation servers arranged on a same network, determination of an operational one and a spare one of the servers must be determined in advance by a maintenance engineer.

For example, a server-client type network system disclosed in Japanese Patent Laid-Open Application No. Heisei 7-182297 includes a plurality of server units which communicate with each other to execute same information processing on the same network, and one of the server units which possesses a network operation right is determined as an operational server unit while the other is determined as a spare server unit. The spare server unit transmits and receives data to and from the operational server unit and establishes synchronism of transaction data to request the operational server unit for data of an operation condition of the same. Then, if an abnormal condition of the operational server unit is detected, then the spare server unit acquires the network operation right and succeeds processing being executed till then from the operational server unit.

However, where the conventional redundancy construction of LAN emulation servers described above is employed, if the plurality of LAN emulation servers which provide equivalent services to each other on the same network operate simultaneously, then there is the possibility that disintegration of the network may occur.

In order to eliminate the possibility described above, the server-client type network system described above must be constructed such that services must be provided only by the operational server unit, and if a failure occurs with the operational server unit, then a maintenance engineer must change over so that the spare server unit may thereafter act as an operational server unit instead.

Further, special means is required to allow communication of information regarding an operation condition of the operational server unit between the operational server unit which is supervised and the spare server unit which supervises.

SUMMARY OF THE INVENTION

It is an object of the present invention to provide a LAN emulation server changing over method by which, even if a plurality of LAN emulation servers on a network operate simultaneously, a spare one of the LAN emulation servers can supervise an operational one of the LAN emulation servers without requiring special means for communication of information regarding an operation condition of the operational LAN emulation server between the operational LAN emulation server and the spare LAN emulation server without causing disintegration of the network and, if a failure occurs with the operational LAN emulation server, changing over to the spare LAN emulation server can be performed immediately.

In order to attain the object described above, according to as aspect of the present invention, there is provided a LAN emulation server changing over method for a server-client type network system wherein a plurality of LAN emulation servers and a plurality of LAN emulation clients are connected to each other by a network, wherein a spare one of the LAN emulation servers subscribes as a LAN emulation client for an operational one of the LAN emulation servers and supervises a condition of the operational LAN emulation server, and, if an abnormal condition of the operational LAN emulation server is detected, then the spare LAN emulation server issues an operational/spare changing over request to the operational LAN emulation server and is changed over to an operational LAN emulation server whereas the LAN emulation server which has been the operational LAN emulation server is changed over to a spare LAN emulation server.

With the LAN emulation server changing over method, since the spare LAN emulation server can subscribe as a LAN emulation client for the operational LAN emulation server and supervise the condition of the operational LAN emulation server, special means for communicating data between the servers is not required. Further, since the condition of the operational LAN emulation server is supervised not periodically at certain time intervals but normally and incessantly, even if a failure occurs with the operational server, service can be automatically resumed immediately only after disconnection of a very short time without intervention of a maintenance engineer.

In the LAN emulation server changing over method, when operation of the network system is started, preferably it is automatically determined which one of the LAN emulation servers becomes an operational LAN emulation server and which one of the LAN emulation servers becomes a spare LAN emulation server. The determination of which one of the LAN emulation servers becomes an operational LAN emulation server and which one of the LAN emulation servers becomes a spare LAN emulation server may be performed by communicating peculiar values of the LAN emulation servers between the LAN emulation servers. Such determination eliminates an operation for setting operational/spare servers by a maintenance engineer.

In the LAN emulation server changing over method, when the operational LAN emulation server is changed over to a spare LAN emulation server, the operational LAN emulation server may release those LAN emulation clients which have been subscribed for the operational LAN emulation server till then, and the released LAN emulation clients may subscribe for the new operational LAN emulation server after the changing over.

According to another aspect of the present invention, there is provided a LAN emulation server changing over method for a server-client type network system wherein a plurality of LAN emulation servers and a plurality of LAN emulation clients are connected to each other by a network, wherein a spare one of the LAN emulation servers subscribes as a LAN emulation client for an operational one of the LAN emulation servers and supervises a condition of the operational LAN emulation server, and, if the spare LAN emulation server detects disconnection from the operational LAN emulation server and fails in a fixed number of retries, then the spare LAN emulation server determines that a failure has occurred with the operational LAN emulation server and begins to act as a temporary operational LAN emulation server and accept requests from the LAN emulation clients, and then if a fixed number of LAN emulation clients do not subscribe for the temporary operational LAN emulation server in a fixed time after the acceptance of requests is started, the temporary operational LAN emulation server determines that there still remains the possibility that the old operational LAN emulation server may still be acting as an operational LAN emulation server and itself issues a request for subscription as a LAN emulation client for the old operational LAN emulation server, whereafter, if the temporary operational LAN emulation server succeeds in the subscription, the temporary operational LAN server releases those LAN emulation clients which have been accepted till then, but, if the temporary operational LAN emulation server does not succeed in the subscription as a LAN emulation client, the temporary operational LAN emulation server accepts requests from the LAN emulation clients again and then sends an operational/spare changing over request to the old operational LAN emulation server, whereupon the temporary operational LAN emulation server is changed over to an operational LAN emulation server while the old operational LAN emulation server is changed over to a spare LAN emulation server.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 4 is a flow chart illustrating operation when the operational server in the system of FIG. 1 is changed over to a spare server by the LAN emulation server switching method of the present invention.

DESCRIPTION OF THE PREFERRED EMBODIMENT

Figure 1:
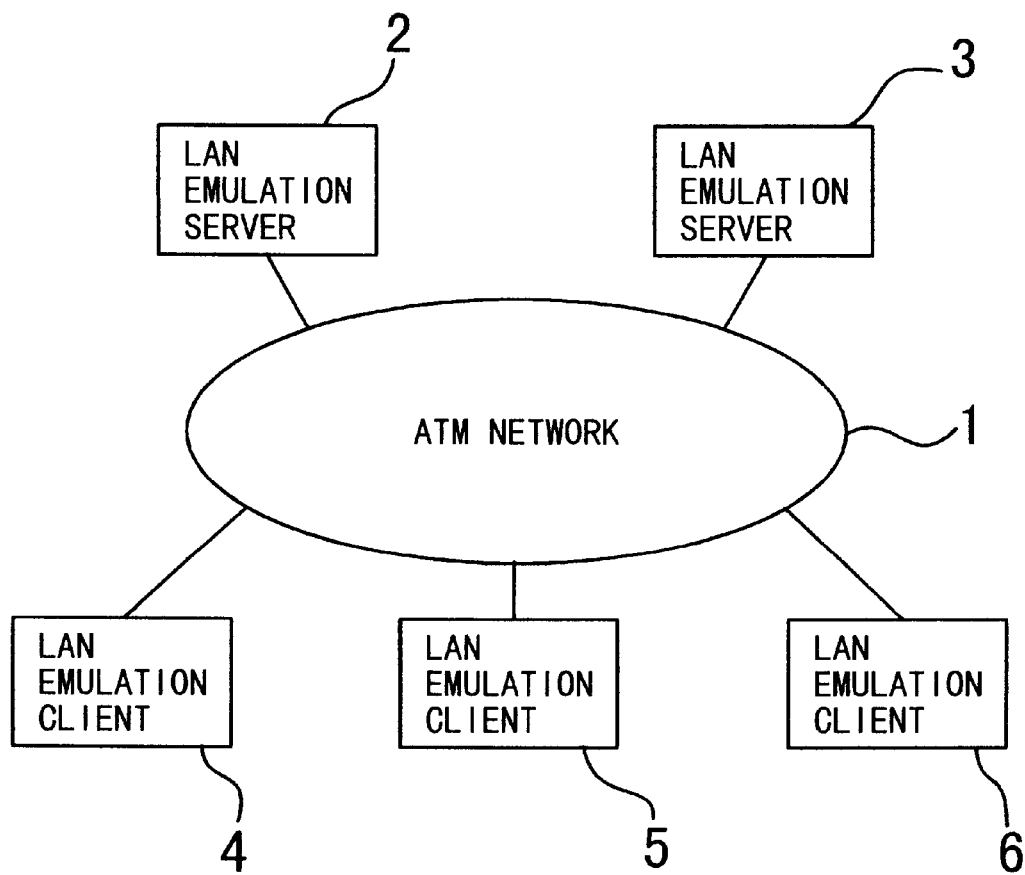
FIG. 1 is a diagrammatic view showing a construction of a system wherein LAN emulation servers are arranged redundantly on a LAN emulation network and to which a LAN emulation server changing over method of the present invention is applied.

Referring first to FIG. 1, there is shown an example of a construction of a LAN emulation network system to which a LAN emulation server changing over method of the present invention is applied. The system shown includes an ATM (Asynchronous Transfer Mode) network 1, a first LAN emulation server 2, a second LAN emulation server 3, and LAN emulation client apparatus 4 to 6.

Figure 2:
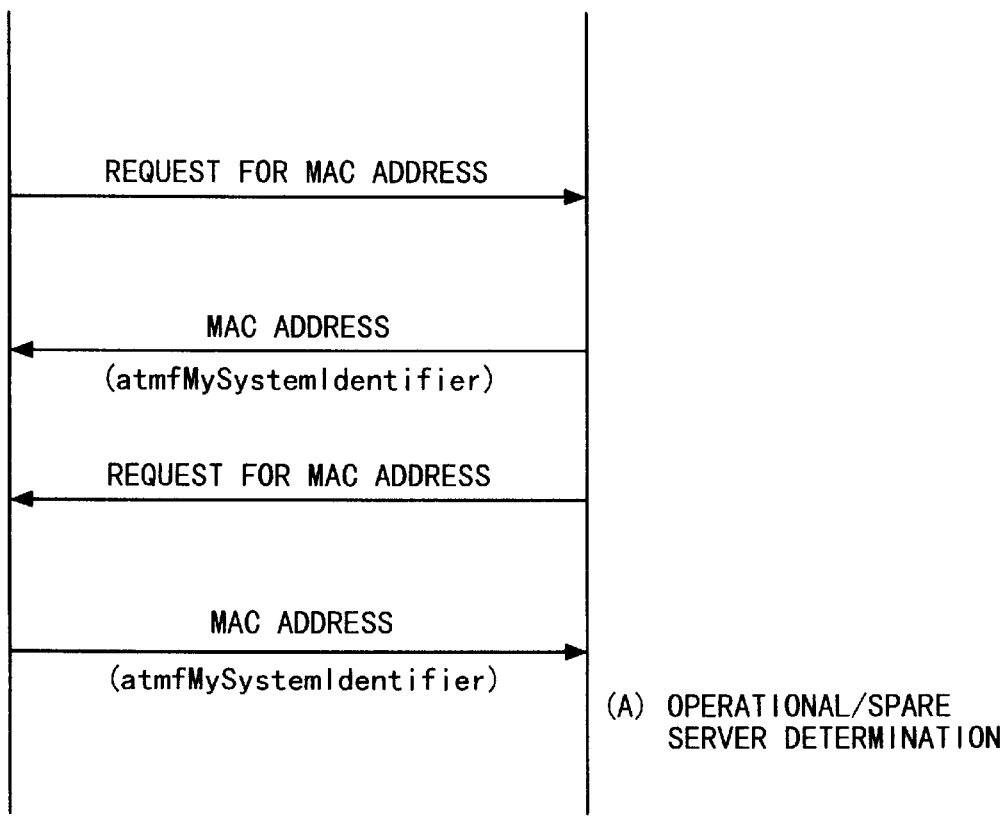
FIG. 2 is a sequence diagram illustrating a process for determination of operational/spare servers between the LAN emulation servers shown in FIG. 1 upon starting of LAN emulation service.

FIG. 2 illustrates a process of determination of an operational LAN emulation server when LAN emulation service of the LAN emulation network system of FIG. 1 is to be started.

It is assumed that the first LAN emulation server 2 and the second LAN emulation server 3 have a physical link established therebetween in advance. Upon starting of LAN service, the first LAN emulation server 2 and the second LAN emulation server 3 communicate unique data they have as servers such as medium access control (MAC) addresses of the apparatus or ATM addresses of LAN emulation servers between them. An operational server and a spare server are determined based on the data.

The determination of an operational server and a spare server is performed, for example, depending upon an order of values of the data such as an ascending order or a descending order. The determination is not changed until an operational/spare changing over request is communicated. Then, after the determination, only the operating server accepts requests from the LAN emulation client apparatus 4 to 6 and provides LAN service. Now, it is assumed that the first LAN emulation server 2 is determined as operational server while the second LAN emulation server 3 is determined a spare server.

Figure 3:
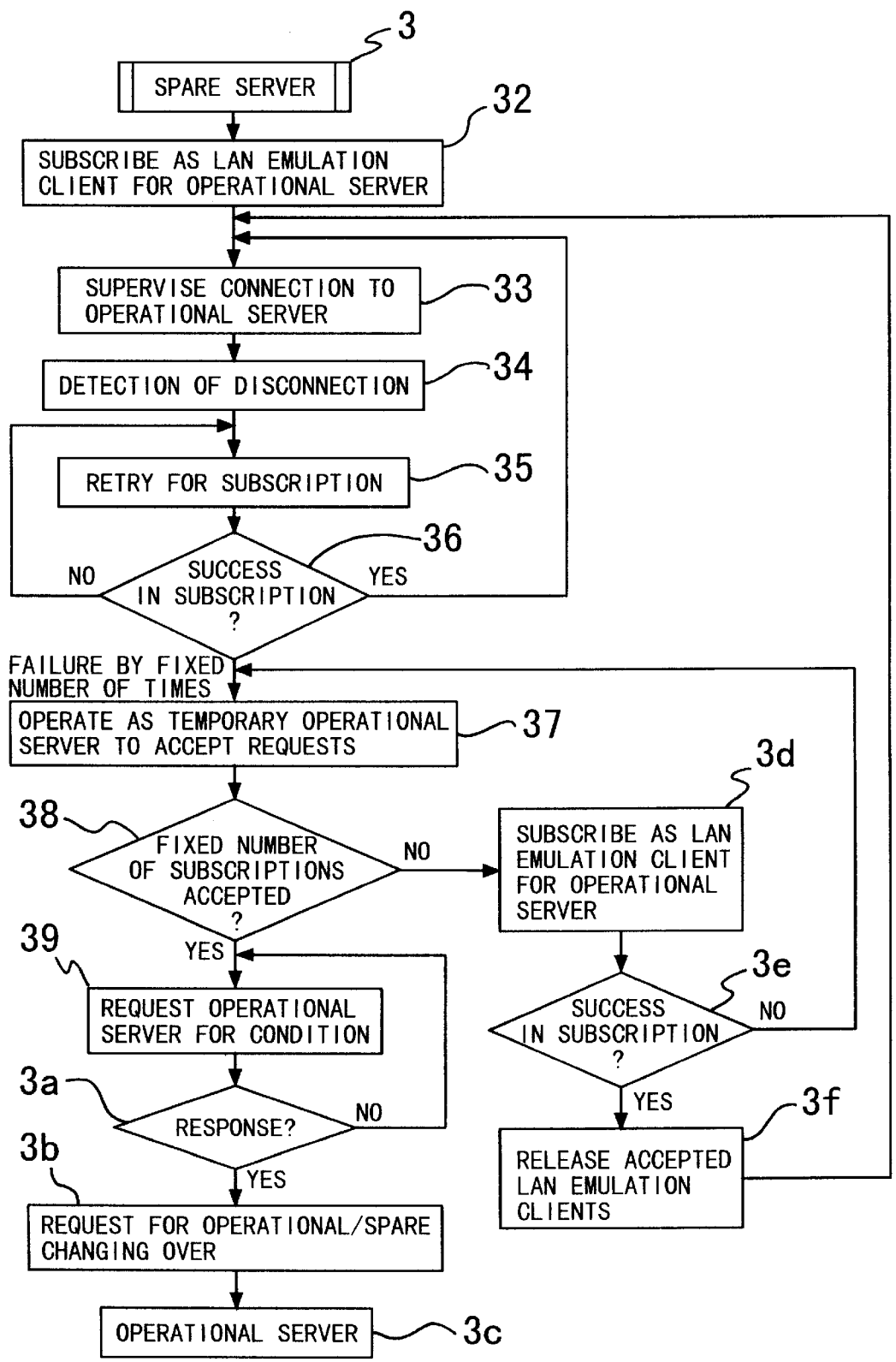
FIG. 3 is a flow chart illustrating operation when the spare server in the system of FIG. 1 is changed over to an operational server by the LAN emulation server switching method of the present invention.

FIG. 3 illustrate operation of the system of FIG. 1 when the spare server 3 is changed over to an operating server while FIG. 4 illustrates operation of the system of FIG. 1 when the operational server 2 is changed over to a spare server.

The spare server 3 ELAN (emulation LAN) subscribes as a LAN emulation client (LEC) for the operational server 2 (step 32) and supervises the condition of the operational server 2 (step 33). If the connection to the operational server 2 is cut (step 34), then the spare server 3 tries to connect to the operational server 2 by a fixed number of times (steps 35 and 36).

If the spare server 3 cannot succeed in the subscription (the subscription cannot be achieved by the fixed number of trials), then it is determined that a failure has occurred with the operating server, and the spare server 3 begins to act as a temporary operational server and accept requests from the LAN emulation clients (step 37). If subscription of a fixed number of LAN emulation clients is not performed in a fixed time after acceptance of requests has been started (when the discrimination in step 38 is NO), there is the possibility that the operational server 2 may remain operating as an operational server, and accordingly, the spare server 3 itself tries to subscribe as a LAN emulation client for the operational server 2.

If the spare server 3 can successfully subscribe as a LAN emulation client for the operational server 2 (YES in step 3e), then since the spare server 3 is still operating as an operational server, the spare server 3 does not change its situation and remains a spare server. Then, the spare server 3 performs connection supervision processing to the operational server in step 33.

On the other hand, if the spare server 3 cannot successfully subscribe for the operational server 2, then it begins to accept requests from the LAN emulation clients again and act as an operational server which provides LAN emulation service. Simultaneously, the spare server 3 sends a "condition request" to the operational server 2 using the physical link to the operational server 2 to effect health checking (step 39). If a "condition response" is received in response to the health check (YES in step 3a), then the operational server 2 sends an "operational/spare changing over request" (step 3b). Taking this opportunity, the situations of the operational server and the spare server are exchanged (step 3c).

In the meantime, as seen in FIG. 4, the first LAN emulation server 2 which has formerly been the operational server releases, if it has LAN emulation clients which subscribe therefor, the LAN emulation clients (step 43) after it receives the "operational/spare changing over request" (step 42), and changes its situation so that it thereafter acts as a spare server (step 44). The LAN emulation clients released will newly subscribe for the new operational server after the changing over. The old or first LAN emulation server 2 which has become the spare server subscribes as a LAN emulation client for the second LAN emulation server 3 and thereafter supervises the condition of the second LAN emulation server 3.

If a line failure in the physical link between the servers in an operating condition is detected, then the situations are not changed. If, upon line releasing of the physical link, both of the servers mutually subscribe for the other severs and hence the former operational server can successfully subscribe, then both of the servers will act as operational servers. Therefore, in accordance with the rule upon starting of service, the server having a smaller MAC address is determined as an operational server while the other server is determined as a spare server.

While preferred embodiments of the present invention have been described using specific terms, such description is for illustrative purpose only, and it is to be understood that changes and variations may be made without departing from the spirit or scope of the following claims.

What is claimed is:

1. A local area network (LAN) emulation server change over method for a server-client type network system comprising first and second LAN emulation servers and a plurality of LAN emulation clients connected to each other by a network, said change over method comprising the steps:

subscribing a spare one of said LAN emulation servers as a LAN emulation client for an operational one of said LAN emulation servers;

constantly monitoring a connection to said operational server to detect an abnormal condition of the operational LAN emulation server issuing a change over request signal from the spare LAN emulation server when an abnormal condition is detected;

changing over said spare LAN emulation server to an operational LAN emulation server; and changing over said operational LAN emulation server which malfunctioned to a spare LAN emulation server.

2. The LAN emulation server change over method as claimed in claim 1, wherein when operation of said network system is started, one of said LAN emulation servers automatically becomes an operational LAN emulation server and the other of said LAN emulation servers becomes a spare LAN emulation server.

3. The LAN emulation server change over method as claimed in claim 2, wherein the determination of which one of said LAN emulation servers becomes an operational LAN emulation server and which one of said LAN emulation servers becomes a spare LAN emulation server is performed by communicating peculiar values of said LAN emulation servers between said LAN emulation servers.

4. The LAN emulation server change over method as claimed in claim 1, wherein when the operational LAN emulation server is changed over to a spare LAN emulation server, the operational LAN emulation server releases present LAN emulation clients which have been subscribed for the operational LAN emulation server, and the released LAN emulation clients subscribe for the new operational LAN emulation server after the change over.

5. A LAN emulation server change over method for a server-client type network system wherein first and second LAN emulation servers and a plurality of LAN emulation clients are connected to each other by a network, said method comprising the steps:

subscribing a spare one of said LAN emulation servers as a LAN emulation client for an operational one of said LAN emulation servers;

said spare LAN emulation server constantly monitoring a connection to said operational LAN emulation server;

if the spare LAN emulation server detects disconnection from the operational LAN emulation server and fails to reconnect in a fixed number of retries, then the spare LAN emulation server determines that a failure has occurred with the operational LAN emulation server and begins to act as a temporary operational LAN emulation server and accepts requests from the LAN emulation clients, and if a fixed number of LAN emulation clients do not subscribe for the temporary operational LAN emulation server in a fixed time after the acceptance of requests is started, the temporary operational LAN emulation server determines that there still remains the possibility that the old operational LAN emulation server may still be acting as an operational LAN emulation server and itself issues a request for subscription as a LAN emulation client for the old operational LAN emulation server, whereafter, if the temporary operational LAN emulation server succeeds in the subscription, the temporary operational LAN server releases those LAN emulation clients which have been accepted till then; but, if the temporary operational LAN emulation server does not succeed in the subscription as a LAN emulation client, the temporary operational LAN emulation server accepts requests from the LAN emulation clients again and then sends an change over request signal to the old operational LAN emulation server, whereupon the temporary operational LAN emulation server is changed over to an operational LAN emulation server while the old operational LAN emulation server is changed over to a spare LAN emulation server.

6. The LAN emulation server changing over method as claimed in claim 5, wherein, when the old operational LAN emulation server is changed over to a spare LAN emulation server, the old operational LAN emulation server releases those LAN emulation clients which have been subscribed for the old operational LAN emulation server, and the released LAN emulation clients subscribe for the new operational LAN emulation server after the changing over.

7. A method for automatically replacing a malfunctioning server in a client/server network, comprising the steps of:

providing at least two servers connected by a network to a plurality of clients;

exchanging peculiar data between said at least two servers;

assigning one of said at least two servers as an operational server for servicing said clients;

assigning the other of said at least two servers as a spare server;

subscribing said spare server as a client of said operational server;

said spare server constantly monitoring a connection to the operational server to detect a malfunction;

issuing a change over request signal by said spare server when a malfunction is detected;

said plurality of clients releasing subscriptions from said operational server;

assigning said spare operational server as a new operational server; and subscribing said plurality of clients to said new operational server.

8. The method for automatically replacing a malfunctioning server in a client/server network as recited in claim 7 wherein said step of exchanging peculiar data comprises exchanging ones of medium access control (MAC) addresses and asynchronous transfer mode (ATM addresses.

9. The method for automatically replacing a malfunctioning server in a client/server network as recited in claim 7 wherein said step of constantly monitoring a condition to the operational server to detect a malfunction comprises detecting a disconnect of said operational server and a number of unsuccessful reconnect attempts.

10. The method for automatically replacing a malfunctioning server in a client/server network as recited in claim 9, further comprising the steps of:

waiting a period of time for clients to subscribe to said new operational server;

if a number of clients fail to subscribe during said period, assuming that said operational server is still in service; and said new operational server attempting to resubscribe as a client to said operational server.

* * * * *